(12) United States Patent
Takano et al.

(10) Patent No.: US 11,477,368 B1
(45) Date of Patent: Oct. 18, 2022

(54) IMAGING DEVICE, IMAGING METHOD, AND ELECTRONIC APPARATUS

(71) Applicant: Sony Semiconductor Solutions Corporation, Kanagawa (JP)

(72) Inventors: Chiaki Takano, Kanagawa (JP); Toshimasa Shimizu, Kanagawa (JP); Robert James Childs, Victor, NY (US); Robert Justin Jarnot, Bergen, NY (US); John Steven Childs, Fairport, NY (US); Scott Rogerson, Rochester, NY (US); Cody Cziesler, Fairport, NY (US)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 17/381,434

(22) Filed: Jul. 21, 2021

Related U.S. Application Data

(60) Provisional application No. 63/180,018, filed on Apr. 26, 2021.

(51) Int. Cl.
  H04N 5/232 (2006.01)
  H04N 5/376 (2011.01)
  (Continued)

(52) U.S. Cl.
  CPC ......... *H04N 5/23227* (2018.08); *G06F 1/324* (2013.01); *H04N 5/23245* (2013.01);
  (Continued)

(58) Field of Classification Search
  CPC ............ H04N 5/23227; H04N 5/23241; H04N 5/232411; H04N 5/23245; H04N 5/343; H04N 5/3698; H04N 5/3765; G06T 1/324
  See application file for complete search history.

(56) References Cited

U.S. PATENT DOCUMENTS 8,046,601 B1 * 10/2011 Paz ........................... G06F 1/32
                                                              713/300
8,384,463 B2    2/2013 Tokue
(Continued)

FOREIGN PATENT DOCUMENTS

CN       109426479 A  *  3/2019
WO       2019/146430 A1   8/2019

OTHER PUBLICATIONS

International Search Report and Written Opinion dated Jul. 29, 2022 for corresponding International Application No. PCT/US22/20342.
(Continued)

*Primary Examiner* — Paul M Berardesca
(74) *Attorney, Agent, or Firm* — Michael Best & Friedrich LLP

(57) ABSTRACT

An imaging device includes a controller and a generator. The controller controls an imaging unit on the basis of a command and data received from a host in accordance with an I2C/I3C communication protocol. The generator generates a second control signal indicating whether or not to apply intra-frame dynamic frequency scaling (DFS) or intra-frame dynamic voltage frequency scaling (DVFS) on the basis of a first control signal received from the host via a first route different from the I2C/I3C communication protocol, and outputs the second control signal to the host via a second route different from the I2C/I3C communication protocol.

14 Claims, 5 Drawing Sheets

(51) Int. Cl.
  *H04N 5/369* (2011.01)
  *G06F 1/324* (2019.01)
  *H04N 5/374* (2011.01)

(52) U.S. Cl.
  CPC ..... *H04N 5/232411* (2018.08); *H04N 5/3698* (2013.01); *H04N 5/374* (2013.01); *H04N 5/3765* (2013.01)

(56) References Cited

U.S. PATENT DOCUMENTS

| | | |
|---|---|---|
| 2003/0182481 A1 | 9/2003 | Schoenborn |
| 2013/0139170 A1 | 5/2013 | Prabhakar et al. |
| 2013/0311801 A1 | 11/2013 | Kong et al. |
| 2015/0234452 A1* | 8/2015 | Heo .......................... G06F 1/26 713/320 |
| 2022/0060623 A1* | 2/2022 | Elizov ................ H04N 5/23227 |
| 2022/0179437 A1* | 6/2022 | Lee ..................... H02M 1/0045 |

OTHER PUBLICATIONS

Choi, K et al.. "Frame-Based Dynamic Voltage and Frequency Scaling for an MPEG Player" 732-737, Online, Nov. 10, 2002; ICCAD '02: Proceedings of the 2002 IEEE/ACM International Conference on Computer-aided Design • Nov. 2002 • pp. 732-737; [Retrieved from the Internet on May 27, 2022], <URL:https://sportlab.usc.edu/-kihwan/dvfs.pdf>; DOI: https://doi.org/10.1145/774572.774680; abstract, p. 7, col. 1, paragraph 3-col. 2, paragraph 1, p. 9, col. 1, paragraph 5-col. 2, paragraph 1.

* cited by examiner

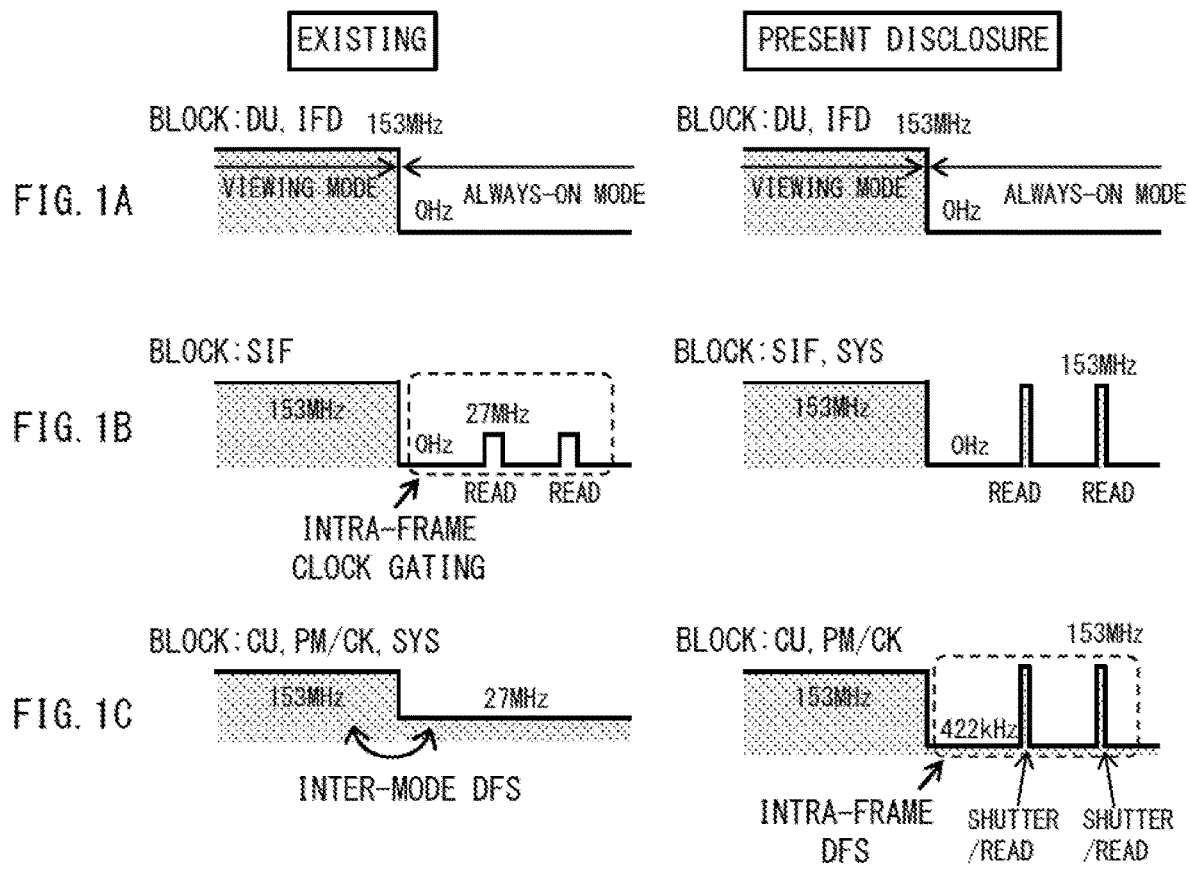

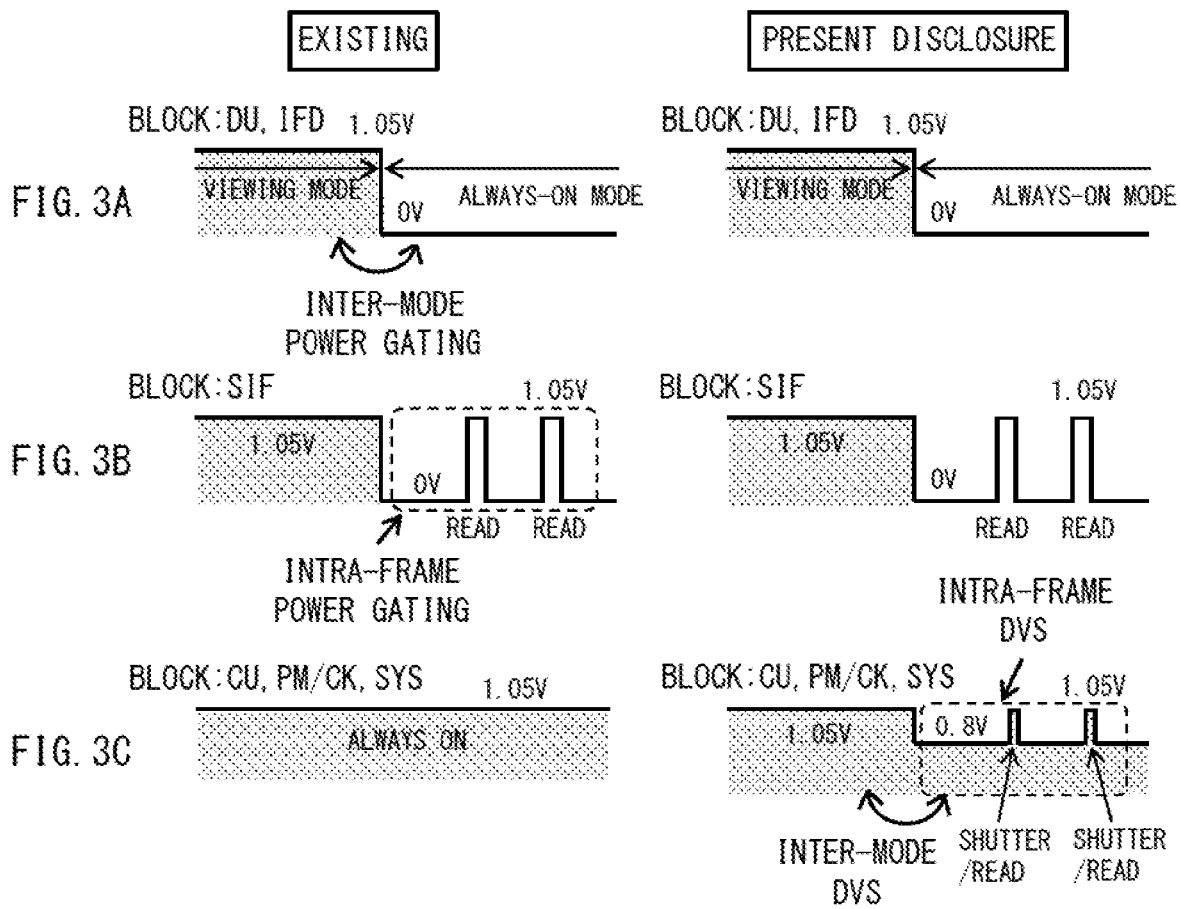

IMAGING DEVICE, IMAGING METHOD, AND ELECTRONIC APPARATUS

BACKGROUND

The disclosure relates to an imaging device, an imaging method, and an electronic apparatus.

Recently, imaging devices have seen development in metal oxide semiconductor (MOS) image sensors, such as complementary metal oxide semiconductors (CMOS). For example, Japanese Unexamined Patent Application Publication No. 2010-245506 discloses an imaging device in which a semiconductor wafer having a pixel array portion and a semiconductor wafer having logic circuitry are laminated.

SUMMARY

It has been desired to save the power consumption of imaging devices.

It is desirable to provide an imaging device, an imaging method, and an electronic apparatus that make it possible to save the power consumption.

An imaging device according to a first aspect of the disclosure includes a controller and a generator. The controller controls an imaging unit on the basis of a command and data received from a host in accordance with an I2C/I3C communication protocol. The generator generates a second control signal indicating whether or not to apply intra-frame dynamic frequency scaling (DFS) or intra-frame dynamic voltage frequency scaling (DVFS) on the basis of a first control signal received from the host via a first route different from the I2C/I3C communication protocol, and outputs the second control signal to the host via a second route different from the I2C/I3C communication protocol.

An imaging method according to the first aspect of the disclosure includes:

generating a second control signal indicating whether or not to apply intra-frame dynamic frequency scaling (DFS) or intra-frame dynamic voltage frequency scaling (DVFS) on the basis of a first control signal transmitted from a host that transmits a command and data in accordance with an I2C/I3C communication protocol via a first route different from the I2C/I3C communication protocol; and outputting the second control signal to the host via a second route different from the I2C/I3C communication protocol.

An electronic apparatus according to the first aspect of the disclosure includes a host, a controller, and a generator. The host is configured to communicate in accordance with an I2C/I3C communication protocol. The controller controls an imaging unit on the basis of a command and data received from the host in accordance with the I2C/I3C communication protocol. The generator generates a second control signal indicating whether or not to apply intra-frame dynamic frequency scaling (DFS) or intra-frame dynamic voltage frequency scaling (DVFS) on the basis of a first control signal received from the host via a first route different from the I2C/I3C communication protocol, and outputs the second control signal to the host via a second route different from the I2C/I3C communication protocol.

An imaging device according to a second aspect of the disclosure includes a controller and a generator. The controller controls an imaging unit on the basis of a command and data received from a host in accordance with an I2C/I3C communication protocol. The generator decodes a slave address included in the command received from the host and generates a control signal indicating whether or not to apply intra-frame dynamic frequency scaling (DFS) or intra-frame dynamic voltage frequency scaling (DVFS) on the basis of the slave address obtained by the decoding, and outputs the control signal to the host via a route different from the I2C/I3C communication protocol.

An imaging method according to the second aspect of the disclosure includes:

decoding a slave address included in a dummy command transmitted from a host that transmits a command and data in accordance with an I2C/I3C communication protocol;

generating a control signal indicating whether or not to apply intra-frame dynamic frequency scaling (DFS) or intra-frame dynamic voltage frequency scaling (DVFS) on the basis of the slave address obtained by the decoding; and outputting the control signal to the host via a route different from the I2C/I3C communication protocol.

An electronic apparatus according to the second aspect of the disclosure includes a host, a controller, and a generator. The host is configured to communicate in accordance with an I2C/I3C communication protocol. The controller controls an imaging unit on the basis of a command and data received from the host in accordance with the I2C/I3C communication protocol. The generator decodes a slave address included in a dummy command received from the host, generates a control signal indicating whether or not to apply intra-frame dynamic frequency scaling (DFS) or intra-frame dynamic voltage frequency scaling (DVFS) on the basis of the slave address obtained by the decoding, and outputs the control signal to the host via a route different from the I2C/I3C communication protocol.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

FIG. 1A is a diagram illustrating an exemplary temporal change in clock frequency observed when dynamic frequency scaling (DFS) is performed in a COMS image sensor.

FIG. 1B is a diagram illustrating an exemplary temporal change in clock frequency observed when dynamic frequency scaling (DFS) is performed in the COMS image sensor.

FIG. 1C is a diagram illustrating an exemplary temporal change in clock frequency observed when dynamic frequency scaling (DFS) is performed in the COMS image sensor.

FIG. 2 is a table summarizing clock control illustrated in FIGS. 1A to 1C.

FIG. 3A is a diagram illustrating an exemplary temporal change in clock voltage observed when dynamic voltage scaling (DVS) is performed in the COMS image sensor.

FIG. 3B is a diagram illustrating an exemplary temporal change in clock voltage observed when the dynamic voltage scaling (DVS) is performed in the COMS image sensor.

FIG. 3C is a diagram illustrating an exemplary temporal change in clock voltage observed when the dynamic voltage scaling (DVS) is performed in the COMS image sensor.

FIG. 4 is a table summarizing power control illustrated in FIG. 3.

DETAILED DESCRIPTION

Figure 5:
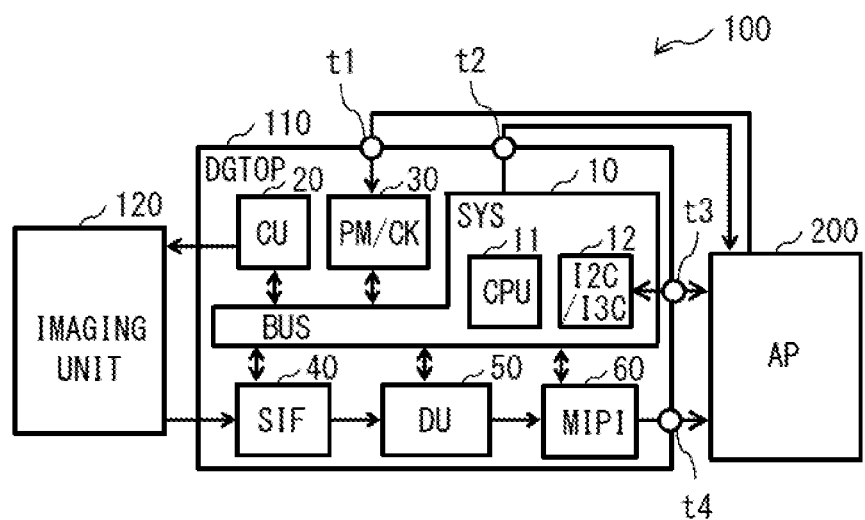
FIG. 5 is a block diagram illustrating an exemplary configuration of an imaging device according to an embodiment of the disclosure.

Some embodiments of the disclosure will now be described in detail with reference to the accompanying drawings. Note that the following description is directed to illustrative examples of the disclosure and not to be construed as limiting the disclosure. Factors including, without limitation, numerical values, shapes, materials, components, positions of the components, and how the components are coupled to each other are illustrative only and not to be construed as limiting to the disclosure. Further, elements in the following example embodiments that are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals without any redundant description.

1. INTRA-FRAME DFS AND INTRA-FRAME DVS

Dynamic frequency scaling (DFS) is a technique for saving power consumption by dynamically changing a clock frequency depending on an operation mode to prevent circuitry from operating at an unnecessarily high clock frequency. Unlike clock gating, which involves clock on/off operations, DFS involves raising or lowering a clock frequency.

Dynamic voltage scaling (DVS) is a technique that may be combined with DFS to achieve a high power voltage operation when the clock frequency is high, and a low power voltage operation when the clock frequency is low. The combined use of DFS and DVS makes it possible to save more power consumption than the single use of DFS. The combination of DFS and DVS is sometimes called dynamic voltage and frequency scaling (DVFS). Unlike power gating, which involves power on/off operations, DVS involves changing a power voltage.

According to an embodiment of the disclosure, the power consumed by the CMOS image sensor (CIS) in an always-on mode is saved by using DFS within one-frame operation (hereinafter referred to as "intra-frame DFS"). Further, in a viewing mode, only the intra-frame DFS is applied to a mode for an image having a VGA-size or less to save the power consumed by the CIS according to the embodiment of the disclosure. The always-on mode of the CIS according to the disclosure refers to a mode in which motion detection is performed on an image with a size of 32×10 (mono), and the viewing mode of the CIS according to the embodiment of the disclosure refers to a mode in which image data with a size of 320×120 (color) or greater is outputted from a mobile industry processor interface (MIPI) block.

The one-frame operation of the CIS includes the repetition of the following periods (1) to (4):

(1) Shutter period: Resetting photo diodes in pixels (2) Integration (or exposure) period: Photoelectrical conversion of photo diodes (3) Read period: A/D conversion of electric charges of photo diodes (4) V-blanking period: Waiting time until the next frame starts In the case in which a small-size image or a low frame rate is used, such as in the always-on mode or the viewing mode of the VGA image size or less, the shutter period (1) and the read period (3) are relatively short, while the V-blanking period (4) accounts for most of the time of one frame. Thus, saving the power consumption in the V-blanking period (4) leads to a reduction in the mean power of the CIS.

A necessary function to be achieved in the V-blanking period (4) is to simply wait for the start timing of the next frame. Thus, to satisfy the necessary function in the V-blanking period (4), it is sufficient to operate selective blocks by supplying the selective blocks with low-frequency clock signals. In the case of a rolling shutter CIS with a short exposure time, the reading operation of the first line may start before the shuttering operation of the last line completes, in some cases. Thus, the integration period (2) may be absent in some cases. Herein, the integration period (2) refers to, rather than the exposure time of each pixel, a period regarding an operational state of the sensor that is simple waiting time from the completion of the shuttering operations for all pixels to the start of the reading operation.

In the case in which a small-size image and low-accuracy ADC are allowable, such as in the always-on mode, the shutter period (1) and the read period (3) are short. Thus, the integration period (2) remains in many cases. In the integration period (2), the time until the reading operation starts is simply counted. Thus, selective blocks may be operated by being supplied with low-frequency clocks. This also effectively saves the power consumption of the CIS in the integration period (2), as in the V-blanking period (4).

According to the CIS of the embodiment of the disclosure, the V-blanking period (4) and the integration period (2) are the time of waiting until the start of the next frame or the start of the reading while applying only a clock with a frequency of 422 kHz to the circuitry. In the V-blanking period (4) and the integration period (2), clocks are stopped in the CPU and a bus coupled to the CPU. FIGS. 1A to 1C each conceptually represent a change in the clock frequency within one frame. In each of FIGS. 1A to 1C, the CIS according to the embodiment of the disclosure is illustrated in comparison with an existing CIS. These conceptual diagrams illustrate the cases in which the integration period (2) has not remained. According to the existing CIS, intra-frame clock gating is performed in an SIF block described below, and inter-mode DFS is performed in a CU block, a PM/CK block, and an SYS block that are described below. In contrast, according to the CIS of the embodiment of the disclosure, intra-frame clock gating is performed in the SIF block and the SYS block that are described below, and intra-frame DFS is performed in the CU block and the PM/CK block. The CIS according to the embodiment of the disclosure features the newly introduced technology which involves inter-mode DFS and also intra-frame DFS in the CU block and the PM/CK block.

FIG. 2 summarizes clock control adopted to the CIS according to the embodiment of the disclosure. The clock control of the CIS according to the embodiment of the disclosure features the intra-frame DFS newly introduced.

Operating with only a clock of 422 kHz in the V-blanking period and the integration period, the circuitry may operate with a power voltage much lower than a standard power voltage of 1.05 V. The operational specifications of the CIS according to the embodiment of the disclosure have been modified to allow for the following usage: all clocks are stopped for a SYSTOP block accommodating a SRAM, and a power voltage necessary only for maintaining the latest condition is supplied to the SYSTOP block in the V-blanking period and the integration period until the next operation starts.

FIGS. 3A to 3C each conceptually represent a change in the power voltage within one frame. According to the existing CIS, the inter-mode power gating is performed in a DU block and an IFD block, intra-frame power gating is performed in the SIF block, and the standard voltage of 1.05 V is constantly supplied to the CU block, the PM/CK block, and the SYS block. In contrast, according to the CIS of the embodiment of the disclosure, inter-mode DVS and intra-frame DVS are performed in the CU block, the PM/CK block, and the SYS block, instead of constantly supplying the standard voltage. The CIS of the embodiment of the disclosure features the newly introduced technology which involves inter-mode DVS and intra-frame DVS in the CU block, the PM/CK block, and the SYS block, instead of constantly supplying the standard voltage.

FIG. 4 summarizes the power control adopted in the embodiment of the disclosure. The technology which involves inter-mode DVS and intra-frame DVS may be newly introduced to the power control of the CIS according to the embodiment of the disclosure.

2. CONCERNS ABOUT INTRODUCTION OF INTRA-FRAME DFS

Specifications of DFS Control Using Host

According to the specifications of DFS applied to the CIS of the embodiment of the disclosure, clocks are stopped from being supplied to the SYS block in the V-blanking period. Another conceivable option to save the power consumption using the intra-frame DFS is to operate the SYS block by a clock of 422 kHz, as in the case of the CU block and the PM/CK block. However, even if the SYS block is designed to operate with a clock of 422 kHz, some peripheral blocks in the SYS block may fail to work with the clock of 422 kHz alone. The peripheral blocks in the SYS block may include an I2C block and an I3C block. Accordingly, there is little functional difference between the case in which clocks are completely stopped and the case in which the SYS block operates with a clock of 422 kHz. Thus, clocks for the SYS block are stopped in the CIS according to the embodiment of the disclosure.

Meanwhile, the use of DFS raises a concern that communication from a host, which may be an external controller such as an application processor, to the CIS according to the embodiment of the disclosure is disabled. While the SYS block is operating, the host is able to control the SYS block using the I2C or the I3C block. However, once the SYS block is switched to a DFS-applied mode in which DFS is applied under the control of the host, it becomes difficult for the host to control the SYS block, thus resulting in a difficulty in switching back from the DFS-applied mode to a DFS-unapplied mode in which DFS is not applied. Detailed examination of the operation of the CIS according to the embodiment of the disclosure demonstrates that DFS is performed within one frame. The SYS block thus constantly operates in the shutter period and the read period. Accordingly, the host is able to communicate with the SYS block only in the shutter period and the read period. However, the host is unable to recognize when the SYS block is operating. This gives a limitation on the specifications of the CIS: The communication from the host to the SYS block using the I2C block and the I3C block should not be performed while the DFS-applied mode is selected regardless of the operational state of the CIS according to the embodiment of the disclosure.

As described above, once a switch is made to the DFS-applied mode, the host finds it difficult to control the SYS block. A conceivable measure to address such a concern is to change the specifications of the I2C block or the I3C block so that the host is able to control the CIS even in the DFS-applied mode. However, it is difficult to change the basic block design over a finite period of time. Herein, two methods are proposed to address such a concern about the CIS. The first method includes extending the function of an existing GPO pin (an output from the CIS) and changing the specifications of an existing GPI pin (an input to the CIS) in order to enable the host to control DFS. The second method includes separating a particular function of the I2C or I3C block operable in a clockless manner from a function operable with clocks, and using a frontend unit having the particular function operable in clockless manner to enable the host to control DFS. Hereinafter, the first method is described in an embodiment described below, and the second method is described in a modification example of the embodiment described below.

3. EMBODIMENT

FIG. 5 is a block diagram illustrating an exemplary configuration of an imaging device 100 according to an embodiment of the disclosure. The imaging device 100 includes a controller (DGTOP) 110 and an imaging unit 120. The imaging unit 120 acquires image data through imaging and outputs the acquired image data to the controller 110. The controller 110 controls imaging in the imaging unit 120 and outputs the image data obtained through the imaging in the imaging unit 120 to an application processor 200 serving as a host.

The controller 110 includes an SYS block 10, a CU block 20, a PM/CK block 30, a SIF block 40, a DU block 50, and a mipi block 60.

The SIF block 40 is an interface that receives the image data obtained by the imaging unit 120. The SIF block 40 outputs the image data received from the imaging unit 120 to the DU block 50. The DU block 50 performs predetermined image processing on the image data received from the imaging unit 120 via the SIF block 40, and outputs the resultant image data to the mipi block 60. The mipi block 60 communicates with the application processor 200 in accordance with the mipi protocol. The mipi block 60 transmits the image data received from the DU block 50 to the application processor 200 in accordance with the mipi protocol, for example.

The SYS block 10 communicates with the application processor 200. The SYS block 10 controls the imaging unit 120 on the basis of an I2C/I3C signal received from the application processor 200 in accordance with the I2C/I3C communication protocol. Herein, the term "I2C/I3C" means I2C or I3C. The I2C/I3C communication protocol is a protocol for communication between the imaging unit 120 and the application processor 200 that controls the imaging unit 120. The SYS block 10 includes, for example, a CPU 11 and an I2C/I3C block 12. The CPU 11 controls the imaging unit 120 on the basis of a command and data received from the application processor 200 via the I2C/I3C block 12. The I2C/I3C block 12 communicates with the application processor 200 via a terminal t3 in accordance with the I2C/I3C communication protocol. For example, the I2C/I3C block 12 retrieves a command and data from the I2C/I3C signal received from the application processor 200, and outputs the retrieved command and data to the CPU 11. The CPU 11 and the I2C/I3C block 12 operate on the basis of several types of clock signals transmitted from the PM/CK block 30. The SYS block 10, the CU block 20, and the PM/CK block 30 perform mutual data communication via a bus, for example.

The CU block 20 generates an imaging unit control signal based on a control signal received from the SYS block 10, and outputs the imaging unit control signal to the imaging unit 120. The CU block 20 and the PM/CK block 30 control the start timing and the end timing of each operational state by operating in cooperation with each other. Examples of the operational states controlled by the CU block 20 and the PM/CK block 30 may include the shutter period, the integration period, the read period, and the V-blanking period.

The PM/CK block 30 sets the frequency of one clock signal (hereinafter, simply referred to as "clock frequency") used to operate the SYS block 10 on the basis of a GPI signal received from the application processor 200 via a GPI terminal t1. For example, the PM/CK block 30 determines the polarity of the GPI signal received from the application processor 200 via the GPI terminal t1. The PM/CK block 30 determines the polarity of the GPI signal at the start timing of a predetermined operational state (e.g., the integration period or the V-blanking period), for example. The PM/CK block 30 sets the clock frequency used to operate the SYS block 10 on the basis of the result of the determination. For example, the PM/CK block 30 sets the clock frequency for a predetermined operational state (e.g., the integration period or the V-blanking period) on the basis of the result of the determination. For instance, when the GPI signal has a high polarity, the PM/CK block 30 sets the clock frequency to a relatively high frequency. For instance, when the GPI signal has a low polarity, the PM/CK block 30 sets the clock frequency to a relatively low frequency.

The PM/CK block 30 holds a control signal corresponding to the set clock frequency therein. The PM/CK block 30 includes, for example, a control register that stores control data corresponding to the set clock frequency. When the GPI signal has a low polarity, the PM/CK block 30 may generate a control signal for stopping clock signals and hold the control signal therein, for example. In that case, the PM/CK block 30 may include, for example, a control register that stores control data for stopping clock signals. The PM/CK block 30 may hold a control signal corresponding to the voltage set for each operational state therein. In that case, the PM/CK block 30 may include, for example, an operational state register that stores control data corresponding to the voltage set for each operational state.

The PM/CK block 30 generates a control signal indicating whether or not to apply the intra-frame DFS on the basis of the GPI signal received via a route (the GPI terminal t1) different from the I2C/I3C communication protocol. For example, the SYS block 10 determines the polarity of the control signal generated by the PM/CK block 30 and indicating whether nor not to apply the intra-frame DFS at the start timing of a predetermined operational state (e.g., the integration period or the V-blanking period). When the result of the determination indicates that the intra-frame DFS is not to be applied, the SYS block 10 generates a low-polarity control signal. The SYS block 10 outputs the low-polarity control signal as a GPO signal to the application processor 200 via a route (the GPO terminal t2) different from the I2C/I3C communication protocol.

Figure 6:
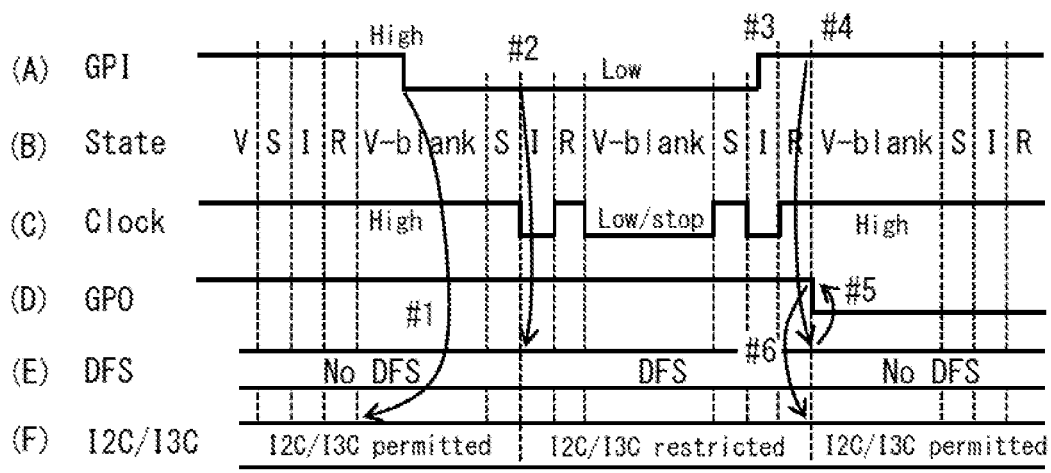
FIG. 6 is a diagram illustrating an exemplary method of controlling DFS in the imaging device illustrated in FIG. 5.

FIG. 6 illustrates an exemplary method of controlling the intra-frame DFS using GPI and GPO. Part (A) of FIG. 6 illustrates the input value of a GPI signal inputted to the GPI terminal t1. Part (B) of FIG. 6 illustrates the operational state of the CIS. In Part (B) of FIG. 6, "V" and "V-blank" denote the V-blanking period, "S" denotes the shutter period, "I" denotes the integration period, and "R" denotes the read period. Part (C) of FIG. 6 illustrates the clock frequency. Part (D) of FIG. 6 illustrates the output value of a GPO signal outputted from the GPO terminal 2. Part (E) of FIG. 6 indicates whether the DFS-applied mode is selected or not. Part (F) of FIG. 6 indicates whether the communication from the application processor 200 via the I2C/I3C block 12 is permitted or not. In the exemplary method of controlling DFS illustrated in FIG. 6, the DFS-unapplied mode is switched to the DFS-applied mode, and the DFS-applied mode is then switched back to the DFS-unapplied mode.

When the operational state is the shutter period or the read period, the SYS block 10 operates regardless of whether DFS is applied or not, as illustrated in Part (C) of FIG. 6, for example. As illustrated in Part (A) of FIG. 6, for example, the application processor 200 instructs the PM/CK block 30 to apply DFS by setting the polarity of the GPI signal to be low (#1). At this time, the PM/CK block 30 does not make DFS applicable immediately. The application processor 200, however, is unable to recognize when the DFS-applied mode starts. Thus, the application processor 200 refrains from communicating via the I2C/I3C block 12 from when the GPI signal is set to the negative (low) polarity.

The PM/CK block 30 reads the GPI signal at a predetermined timing (e.g., #2). When the read GPI signal has a low polarity, the PM/CK block 30 makes a switch to the DFS-applied mode. At this time, the PM/CK block 30 sets the clock frequency to a relatively low frequency, and generates a control signal corresponding to the set clock frequency therein. Thereafter, the PM/CK block 30 outputs a clock having a low frequency on the basis of the control signal. Alternatively, the PM/CK block 30 generates a control signal for stopping clock signals, and stops clocking on the basis of the control signal.

As illustrated in Part (A) of FIG. 6, for example, the application processor 200 instructs the PM/CK block 30 not to apply DFS by setting the polarity of the GPI signal to be high (#3). At this time, the PM/CK block 30 does not make DFS inapplicable immediately. Accordingly, the application processor 200 does not yet start communicating via the I2C/I3C block 12 at this timing.

The PM/CK block 30 reads the GPI signal at a predetermined timing (e.g., #4). When the read GPI signal has a high polarity, the PM/CK block 30 makes a switch to the DFS-unapplied mode. At this time, the PM/CK block 30 sets the clock frequency to a relatively high frequency, and generates a control signal corresponding to the set clock frequency therein. Thereafter, the PM/CK block 30 outputs a clock having a high frequency on the basis of the control signal.

The SYS block 10 outputs a signal to the application processor 200 via a route (the GPO terminal t2) different from the I2C/I3C communication protocol on the basis of the control signal generated by the PM/CK block 30 and indicating whether or not to apply the intra-frame DFS. For example, the SYS block 10 generates a low-polarity signal and outputs the generated low-polarity signal as the GPO signal to the application processor 200 via the GPO terminal t2 (#5). That is, the SYS block 10 toggles the GPO signal at the timing when the DFS-applied mode is switched to the DFS-unapplied mode. The application processor 200 recognizes that DFS has been made inapplicable on the basis of the toggling of the GPO signal acquired via the GPO terminal t2, and starts communicating via the I2C/I3C block 12.

In the embodiment of the disclosure, the application processor 200 is able to control DFS using the GPO and GPI signals. Accordingly, it is possible to effectively save the power consumption by using DFS.

4. MODIFICATION EXAMPLE

Modification Example A

Figure 7:
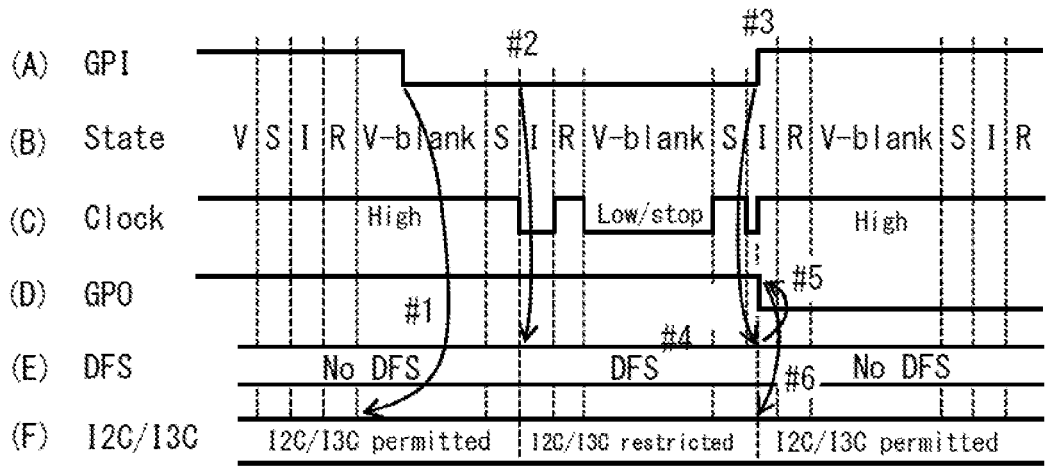
FIG. 7 is a diagram illustrating a modification example of the method of controlling DFS in the imaging device illustrated in FIG. 5.

FIG. 7 illustrate a modification example of the method of controlling the intra-frame DFS using the GPI and GPO. Part (A) of FIG. 7 illustrates the input value of a GPI signal inputted to the GPI terminal t1. Part (B) of FIG. 7 illustrates the operational state of the CIS. Part (C) of FIG. 7 illustrates the clock frequency. Part (D) of FIG. 7 illustrates the output value of the GPO signal outputted from the GPO terminal t2. Part (E) of FIG. 7 indicates whether the DFS-applied mode is selected or not. Part (F) of FIG. 7 illustrates whether the communication from the application processor 200 via the I2C/I3C block 12 is permitted or not. In the exemplary method of controlling DFS illustrated in FIG. 7, the DFS-unapplied mode is switched to the DFS-applied mode, and the DFS-applied mode is then switched back to the DFS-unapplied mode.

In Modification Example A, the PM/CK block 30 detects switching (toggling) of the polarity of the GPI signal inputted to the GPI terminal t1. For example, the PM/CK block 30 detects the switch of the polarity of the GPI signal from a low polarity to a high polarity (#4). At this time, the PM/CK block 30 makes a switch to the DFS-unapplied mode, as illustrated in Part (E) of FIG. 7, for example. The PM/CK block 30 further sets the clock frequency to a relatively high frequency as illustrated in FIG. 7 (C), for example, and outputs a control signal corresponding to the set clock frequency to the CU block 20.

After the CU block 20 outputs a clock having a relatively high frequency, the SYS block 10 starts operating, generates a low-polarity signal, and outputs the generated low-polarity signal as the GPO signal to the application processor 200 via the GPO terminal t2 (#5). That is, the SYS block 10 toggles the GPO signal at the timing when the DFS-applied mode is switched to the DFS-unapplied mode. The application processor 200 recognizes that DFS has been made inapplicable on the basis of the toggling of the GPO signal acquired via the GPO terminal t2, and starts communicating via the I2C/I3C block 12.

In the embodiment described above, it may take a long time from when the application processor 200 toggles the GPI signal to when the communication via the I2C/I3C block 12 is enabled, in some cases. Thus, in Modification Example A, the switch to the DFS-unapplied mode is made using toggling of the GPI signal as a trigger, and the GPO signal is toggled at the timing when the switch to the DFS-unapplied mode is made. This configuration allows the communication via the I2C/I3C block 12 to start earlier than the configuration of the embodiment described above.

Modification Example B

In the embodiment and the modification example described above, the control lines for the GPI and GPO are provided between the application processor 200 and the controller 110, in addition to the I2C or I3C control line. However, a configuration without the GPI and GPO may be employed, as illustrated in FIG. 8.

Figure 8:
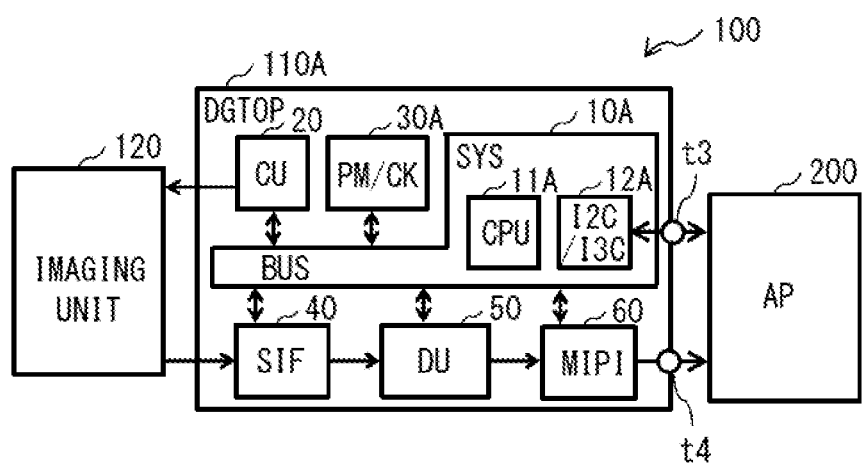
FIG. 8 is a block diagram illustrating a modification example of the configuration of the imaging device illustrated in FIG. 5.

FIG. 8 is a block diagram illustrating an exemplary configuration of the imaging device 100 according to a modification example (Modification Example B) of the embodiment described above. The imaging device 100 according to Modification Example B includes a controller (DGTOP) 110A and the imaging unit 120. The imaging unit 120 acquires image data through imaging and outputs the acquired image data to the controller 110A. The controller 110A controls imaging in the imaging unit 120 and outputs the image data obtained through the imaging in the imaging unit 120 to the application processor 200 serving as a host.

The controller 110A includes an SYS block 10A, the CU block 20, a PM/CK block 30A, the SIF block 40, the DU block 50, and the mipi block 60.

The SYS block 10A controls the imaging unit 120 on the basis of an I2C/I3C signal received from the application processor 200 while communicating with the application processor 200. The SYS block 10A includes, for example, a CPU 11A and an I2C/I3C block 12A. The CPU 11A controls the imaging unit 120 on the basis of a command and data received from the application processor 200 via the I2C/I3C block 12A. The I2C/I3C block 12A communicates with the application processor 200 in accordance with the I2C/I3C communication protocol. For example, the I2C/I3C block 12A retrieves a command and data from the I2C/I3C signal received from the application processor 200, and outputs the retrieved command and data to the CPU 11A. The CPU 11A and the I2C/I3C block 12A operate on the basis of several types of clock signals transmitted from the PM/CK block 30A. The SYS block 10A the CU block 20, and the PM/CK block 30A perform mutual data communication via a bus, for example.

The CU block 20 generates an imaging unit control signal based on a control signal received from the SYS block 10A, and outputs the imaging unit control signal to the imaging unit 120. The CU block 20 and the PM/CK block 30A control the start timing and the end timing of each operational state by operating in cooperation with each other. Examples of the operational states controlled by the CU block 20 and the PM/CK block 30A may include the shutter period, the integration period, the read period, and the V-blanking period.

The PM/CK block 30A sets the frequency of one clock signal (hereinafter, simply referred to as "clock frequency") on the basis of a DFS signal received from the CPU 11A. For example, the PM/CK block 30A determines the polarity of the DFS signal received from the CPU 11A. For example, the PM/CK block 30A determines the polarity of the DFS signal at the start timing of a predetermined operational state (e.g., the integration period or the V-blanking period). The PM/CK block 30A sets the clock frequency on the basis of the result of the determination. For example, the PM/CK block 30A sets the clock frequency for a predetermined operational state (e.g., the integration period or the V-blanking period) on the basis of the result of the determination. For instance, when the DFS signal has a high polarity, the PM/CK block 30A sets the clock frequency to a relatively high frequency. For instance, when the DFS signal has a low polarity, the PM/CK block 30 sets the clock frequency to a relatively low frequency.

The PM/CK block 30A holds a control signal corresponding to the set clock frequency therein. When the DFS signal has a low polarity, the PM/CK block 30A may generate a control signal for stopping clock signals and hold the control signal therein, for example. The PM/CK block 30A may hold a control signal corresponding to the voltage set for each operational state therein.

Figure 9:
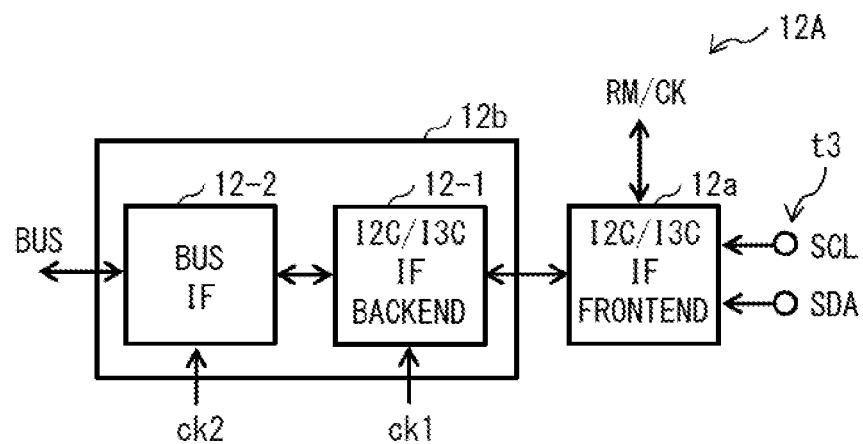
FIG. 9 is a block diagram illustrating an exemplary configuration of an I2C/I3C block illustrated in FIG. 8.

FIG. 9 is a block diagram illustrating an exemplary configuration of the I2C/I3C block 12A. As illustrated in FIG. 9, for example, the I2C/I3C block 12A includes a frontend unit (I2C/I3C IF frontend) 12a and a backend unit 12b.

The frontend unit 12a is a block for implementing only a particular function of the I2C/I3C communication protocol operable in a clockless manner (executable without a clock signal supplied from the PM/CK block 30A). The frontend unit 12a uses a signal SCL or data SDA received from the application processor 200 as a clock. The signal SCL is a clock signal used to synchronize data transfers via the control data buses in accordance with the I2C/I3C communication protocol. The data SDA is image data transmitted from the I2C/I3C block 12A to the application processor 200 or includes various data items used to transmit image data.

For example, the frontend unit 12a decodes a slave address included in a dummy write command or a dummy read command received from the application processor 200 in a clockless manner. The frontend unit 12a determines whether the slave address decoded in the DFS-applied mode matches a slave address assigned to the CIS, for example. For instance, when the decoded slave address matches the slave address assigned to the CIS, the frontend unit 12a generates a signal for making DFS inapplicable (e.g., a low-polarity signal) as a DFS control signal for making DFS applicable or inapplicable, and transmits the signal to the PM/CK block 30A. In that case, the frontend unit 12a may access a control register or an operational state register in the PM/CK block 30A to make DFS inapplicable. The frontend unit 12a determines whether the slave address decoded in the DFS-unapplied mode matches the slave address assigned to the CIS, for example. For instance, when the decoded slave address matches the slave address assigned to the CIS, the frontend unit 12a generates a signal for making DFS applicable (e.g., a high-polarity signal) as the DFS control signal for making DFS applicable or inapplicable, and transmits the signal to the PM/CK block 30A. In that case, the frontend unit 12a may access the control register or the operational state register in the PM/CK block 30A to make DFS applicable.

As illustrated in FIG. 9, for example, the backend unit 12b includes a block (I2C/I3C IF backend) 12-1 and a BUS IF block 12-2. The block 12-1 implements a function of the I2C/I3C communication protocol executable with a clock signal (a clock signal ck1 supplied from the PM/CK block 30A). The BUS IF block 12-2 is a block that requires a clock signal ck2 supplied from the PM/CK block 30A, and serves as an interface for the bus described above. For example, the frontend unit 12a and the backend unit 12b may access the control register or the operational state register in the PM/CK block 30A to apply DFS on the basis of a DFS application request command received from the application processor 200 in the DFS-unapplied mode.

In Modification Example B, the DFS-applied mode is switched to the DFS-unapplied mode using the dummy write command or the dummy read command transmitted from the application processor 200 in place of the GPI terminal t1 and the GPO terminal t2. This allows the application processor 200 to control the switch to the DFS-unapplied mode. Further, the DFS-unapplied mode is switched to the DFS-applied mode using the dummy write command or the dummy read command transmitted from the application processor 200 in place of the GPI terminal t1 and the GPO terminal t2. This allows the application processor 200 to control the switch to the DFS-applied mode. Alternatively, the DFS-unapplied mode is switched to the DFS-applied mode using the DFS application request command in place of the dummy write command and the dummy read command transmitted from the application processor 200, without using the GPI terminal t1 and the GPO terminal t2. Accordingly, it is possible to effectively save the power consumption by using DFS.

Modification Example C

In Modification Example B described above, the frontend unit 12a decodes the slave address included in the dummy write command or the dummy read command transmitted from the application processor 200 in clockless manner, and controls whether or not to apply DFS on the basis of the result of the decoding, for example. Alternatively, in Modification Example B described above, the frontend unit 12a may decode a particular non-dummy write command or a particular non-dummy read command in a clockless manner, and control whether or not to apply DFS on the basis of the result of the decoding.

Modification Example D

In the embodiment and the modification examples described above, DFS is performed to save the power consumption. However, DVFS may be performed in place of DFS in the embodiment and the modification examples described above.

Modification Example E

In the embodiment and the modification examples described above, the application processor 200 controls the CIS using the communication in accordance with the I2C/I3C communication protocol. However, a control method using communication in accordance with a communication protocol other than the I2C/I3C communication protocol may be applied to the embodiment and the modification examples described above.

5. APPLICATION EXAMPLE

Figure 10:
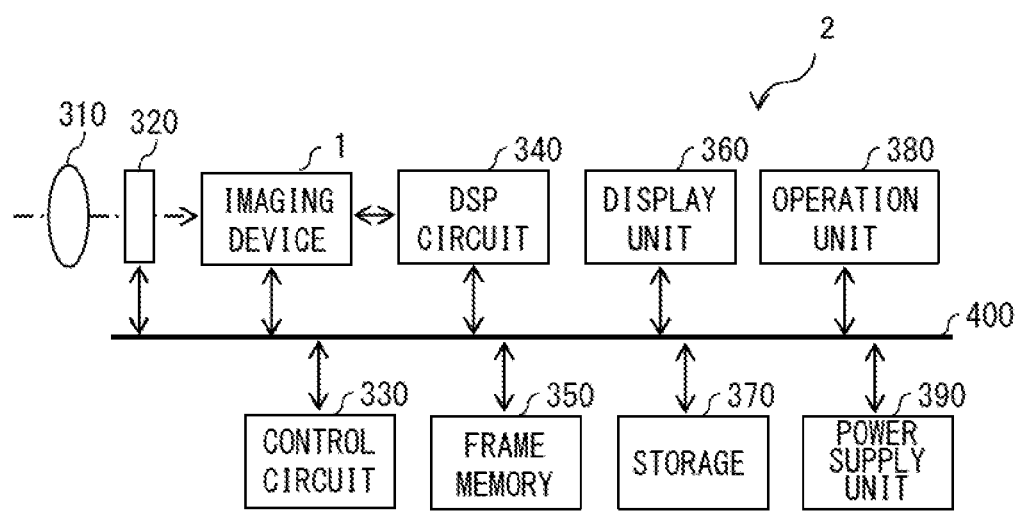
FIG. 10 is a schematic block diagram illustrating an exemplary configuration of an imaging system including the imaging device according to any of the embodiments and the modification examples described above.

The imaging device 1 according to the embodiment and the modification examples described above may be applied to imaging devices such as digital still cameras or video cameras, portable devices with imaging functions, and various electronic apparatuses including imaging elements in their image capturing units, such as copying machines including imaging elements in their image reading units. Furthermore, the embodiments of the present disclosure are also applicable to robots, drones, automobiles, medical equipment (endoscopes), or the like, that include the imaging device 1. Note that the imaging device 1 according to the embodiment and the modification examples described above may be formed into one chip or a single packaged module including an imaging unit and a signal processor or an optical system with an imaging function. Hereinafter, an exemplary imaging system including the imaging device 1 according to any of the embodiments and the modification examples described above is described with reference to FIG. 10. FIG. 10 is a block diagram illustrating an exemplary configuration of an imaging system 2 including the imaging device 1 according to any of the embodiments and the modification examples described above.

As illustrated in FIG. 10, the imaging system 2 includes, for example, the imaging device 1 according to any of the embodiments and the modification examples described above, an optical system 310, a shutter device 320, a control circuit 330, a DSP circuit 340, a frame memory 350, a display unit 360, a storage 370, an operation unit 380, and a power supply unit 390. In the imaging system 2, the imaging device 1 according to any of the embodiments and the modification examples described above, the DSP circuit 340, the frame memory 350, the display unit 360, the storage 370, the operation unit 380, and the power supply unit 390 are coupled to each other via a bus line 400. The DSP circuit 340 corresponds to a specific example of the application processor 200 according to any of the embodiments and the modification examples described above.

The optical system 310 includes one or more lenses. The optical system 310 guides light (incident light) received from a subject to the imaging device 1 to focus the light on a light receiving surface of the imaging device 1. The shutter device 320 is disposed between the optical system 310 and the imaging device 1. The shutter device 320 controls the light irradiation time period and the light shielding time period with respect to the imaging device 1 under the control of the control circuit 330. The imaging device 1 accumulates signal charges for a certain period of time depending on the light focused on the light receiving surface through the optical system 310 and the shutter device 320. The signal charges accumulated in the imaging device 1 are transferred as a pixel signal (image data) to the DSP circuit 340 on the basis of a drive signal (timing signal) supplied from the control circuit 330. That is, the imaging device 1 receives image light (incident light) passing through the optical system 310 and the shutter device 320, and outputs a pixel signal corresponding to the received image light (incident light) to the DSP circuit 340. The control circuit 330 outputs a drive signal for controlling the transfer operation of the imaging device 1 and the shutter operation of the shutter device 320 to drive the imaging device 1 and the shutter device 320.

The DSP circuit 340 is a signal processing circuit that processes the pixel signal (image data) outputted from the imaging device 1. The frame memory 350 temporarily holds the image data processed by the DSP circuit 340 on a frame unit basis. The display unit 360 is, for example, a display panel such as a liquid crystal panel or an organic electroluminescent (EL) panel. The display unit 360 displays a moving image or a still image captured by the imaging device 1. The storage 370 records the image data of a moving image or a still image captured by the imaging device 1 on a recording medium, such as a semiconductor memory or a hard disk. The operation unit 380 issues operation commands for various functions of the imaging system 2 in accordance with operations performed by the user. The power supply unit 390 supplies the imaging device 1, the DSP circuit 340, the frame memory 350, the display unit 360, the storage 370, and the operation unit 380 with electric power for operating these components as appropriate.

In the application example, the imaging device 1 according to any of the embodiments and the modification examples is applied to the imaging system 2. Using such a power-saving imaging device 1, it is possible to provide the imaging system 2 that makes it possible to save the power consumption.

Although the present disclosure has been described with reference to the embodiments and their modification examples, examples of application, and application examples, the present disclosure should not be limited to the foregoing embodiment and the like, and various modifications may be made. It is to be noted that the effects described herein are merely illustrative. The effect of the present disclosure should not be limited to the effects described herein. The present disclosure may have other effects than those described herein.

The present disclosure may also have a following configuration.

(1) An imaging device including:
  a controller controlling an imaging unit on the basis of a command and data received from a host in accordance with an I2C/I3C communication protocol; and
  a generator
    generating a second control signal indicating whether or not to apply intra-frame dynamic frequency scaling (DFS) or intra-frame dynamic voltage frequency scaling (DVFS) on the basis of a first control signal received from the host via a first route different from the I2C/I3C communication protocol, and
    outputting the second control signal to the host via a second route different from the I2C/I3C communication protocol.

(2) The imaging device according to (1), in which the generator sets a frequency of a clock signal used in the controller and an operational state on the basis of the first control signal.

(3) The imaging device according to (2), in which the generator sets the frequency of the clock signal and the operational state on the basis of a polarity of the first control signal and generates the second control signal on the basis of the polarity of the first control signal.

(4) The imaging device according to (2), in which the generator sets the frequency of the clock signal and the operational state on the basis of toggling of the first control signal and generates the second control signals on the basis of the toggling of the first control signal.

(5) An imaging device including:
  a controller controlling an imaging unit on the basis of a command and data received from a host in accordance with an I2C/I3C communication protocol; and
  a generator
    decoding a slave address included in the command received from the host.
    generating a control signal indicating whether or not to apply intra-frame dynamic frequency scaling (DFS) or intra-frame dynamic voltage frequency scaling (DVFS) on the basis of the slave address obtained by the decoding, and
    outputting the control signal to the host via a route different from the I2C/I3C communication protocol.

(6) The imaging device according to (5), in which the generator makes a determination as to whether the slave address obtained by the decoding matches a slave address assigned to the imaging device, and generates the control signal on the basis of a result of the determination.

(7) The imaging device according to (6), in which
the generator generates a signal for making the intra-frame DFS inapplicable as the control signal when the slave address obtained by the decoding in a DFS-applied mode matches the slave address assigned to the imaging device, and
the generator generates a signal for making the intra-frame DFS applicable as the control signal when the slave address obtained by the decoding in a DFS-unapplied mode matches the slave address assigned to the imaging device.
(8) The imaging device according to any one of (5) to (7), in which the generator decodes the slave address included in a dummy write command or a dummy read command received from the host, and generates the control signal on the basis of the slave address obtained by the decoding.
(9) The imaging device according to any one of (5) to (7), in which the generator generates the control signal on the basis of a DFS application command received from the host in a DFS-unapplied mode or a particular write command or a particular read command received from the host in a DFS-applied mode.
(10) The imaging device according to any one of (5) to (7), further including:
a block implementing a function of the I2C/I3C communication protocol operable with a clock, in which
the generator is a block that implements only a function of the I2C/I3C communication protocol operable in a clock-less manner.
(11) An imaging method including:
generating a second control signal indicating whether or not to apply intra-frame dynamic frequency scaling (DFS) or intra-frame dynamic voltage frequency scaling (DVFS) on the basis of a first control signal transmitted from a host that transmits a command and data in accordance with an I2C/I3C communication protocol via a first route different from the I2C/I3C communication protocol; and
outputting the second control signal to the host via a second route different from the I2C/I3C communication protocol.
(12) An imaging method including:
decoding a slave address included in a dummy command transmitted from a host that transmits a command and data in accordance with an I2C/I3C communication protocol;
generating a control signal indicating whether or not to apply intra-frame dynamic frequency scaling (DFS) or intra-frame dynamic voltage frequency scaling (DVFS) on the basis of the slave address obtained by the decoding; and
outputting the control signal to the host via a route different from the I2C/I3C communication protocol.
(13) An electronic apparatus including:
a host configured to communicate in accordance with an I2C/I3C communication protocol;
a controller controlling an imaging unit on the basis of a command and data received from the host in accordance with the I2C/I3C communication protocol; and
a generator
generating a second control signal indicating whether or not to apply intra-frame dynamic frequency scaling (DFS) or intra-frame dynamic voltage frequency scaling (DVFS) on the basis of a first control signal received from the host via a first route different from the I2C/I3C communication protocol, and
outputting the second control signal to the host via a second route different from the I2C/I3C communication protocol.
(14) An electronic apparatus including:
a host configured to communicate in accordance with an I2C/I3C communication protocol:
a controller controlling an imaging unit on the basis of a command and data received from the host in accordance with the I2C/I3C communication protocol; and
a generator
decoding a slave address included in a dummy command received from the host,
generating a control signal indicating whether or not to apply intra-frame dynamic frequency scaling (DFS) or intra-frame dynamic voltage frequency scaling (DVFS) on the basis of the slave address obtained by the decoding, and
outputting the control signal to the host via a route different from the I2C/I3C communication protocol.

In the imaging device, the imaging method, and the electronic apparatus according to the first aspect of the disclosure, the second control signal indicating whether or not to apply the intra-frame DFS or the intra-frame DVFS is generated on the basis of the first control signal received from the host via the first route different from the communication protocol. The second control signal is outputted to the host via the second route different from the communication protocol. Thus, it is possible to efficiently save the power consumption by using DFS.

In the imaging device, the imaging method, and the electronic apparatus according to the second aspect of the disclosure, the slave address included in the dummy command received from the host is decoded. On the basis of the decoded slave address, the second control signal indicating whether or not to apply the intra-frame DFS or the intra-frame DVFS is generated. The second control signal is outputted to the host via the second route different from the communication protocol. Thus, it is possible to efficiently save the power consumption by using DFS.

The invention claimed is:
1. An imaging device comprising:
a controller controlling an imaging unit on a basis of a command and data received from a host in accordance with an I2C/I3C communication protocol; and
a generator
generating a second control signal indicating whether or not to apply intra-frame dynamic frequency scaling (DFS) or intra-frame dynamic voltage frequency scaling (DVFS) on a basis of a first control signal received from the host via a first route different from the I2C/I3C communication protocol, and
outputting the second control signal to the host via a second route different from the I2C/I3C communication protocol.
2. The imaging device according to claim 1, wherein the generator sets a frequency of a clock signal used in the controller and an operational state on a basis of the first control signal.
3. The imaging device according to claim 2, wherein the generator sets the frequency of the clock signal and the operational state on a basis of a polarity of the first control signal and generates the second control signal on the basis of the polarity of the first control signal.
4. The imaging device according to claim 2, wherein the generator sets the frequency of the clock signal and the operational state a basis of toggling of the first control signal and generates the second control signals on the basis of the toggling of the first control signal.

5. An imaging device comprising:
a controller controlling an imaging unit on a basis of a command and data received from a host in accordance with an I2C/I3C communication protocol; and
a generator
decoding a slave address included in the command received from the host,
generating a control signal indicating whether or not to apply intra-frame dynamic frequency scaling (DFS) or intra-frame dynamic voltage frequency scaling (DVFS) on a basis of the slave address obtained by the decoding, and
outputting the control signal to the host via a route different from the I2C/I3C communication protocol.

6. The imaging device according to claim 5, wherein the generator makes a determination as to whether the slave address obtained by the decoding matches a slave address assigned to the imaging device, and generates the control signal on a basis of a result of the determination.

7. The imaging device according to claim 6, wherein
the generator generates a signal for making the intra-frame DFS inapplicable as the control signal when the slave address obtained by the decoding in a DFS-applied mode matches the slave address assigned to the imaging device, and
the generator generates a signal for making the intra-frame DFS applicable as the control signal when the slave address obtained by the decoding in a DFS-unapplied mode matches the slave address assigned to the imaging device.

8. The imaging device according to claim 5, wherein the generator decodes the slave address included in a dummy write command or a dummy read command received from the host, and generates the control signal on a basis of the slave address obtained by the decoding.

9. The imaging device according to claim 5, wherein the generator generates the control signal on a basis of a DFS application command received from the host in a DFS-unapplied mode or a particular write command or a particular read command received from the host in a DFS-applied mode.

10. The imaging device according to claim 5, further comprising:
a block implementing a function of the I2C/I3C communication protocol operable with a clock, wherein
the generator comprises a block that implements only a function of the I2C/I3C communication protocol operable in a clockless manner.

11. An imaging method comprising:
generating a second control signal indicating whether or not to apply intra-frame dynamic frequency scaling (DFS) or intra-frame dynamic voltage frequency scaling (DVFS) on a basis of a first control signal transmitted from a host that transmits a command and data in accordance with an I2C/I3C communication protocol via a first route different from the I2C/I3C communication protocol; and
outputting the second control signal to the host via a second route different from the I2C/I3C communication protocol.

12. An imaging method comprising:
decoding a slave address included in a dummy command transmitted from a host that transmits a command and data in accordance with an I2C/I3C communication protocol;
generating a control signal indicating whether or not to apply intra-frame dynamic frequency scaling (DFS) or intra-frame dynamic voltage frequency scaling (DVFS) on a basis of the slave address obtained by the decoding; and
outputting the control signal to the host via a route different from the I2C/I3C communication protocol.

13. An electronic apparatus comprising:
a host configured to communicate in accordance with an I2C/I3C communication protocol;
a controller controlling an imaging unit on a basis of a command and data received from the host in accordance with the I2C/I3C communication protocol; and
a generator
generating a second control signal indicating whether or not to apply intra-frame dynamic frequency scaling (DFS) or intra-frame dynamic voltage frequency scaling (DVFS) on a basis of a first control signal received from the host via a first route different from the I2C/I3C communication protocol, and
outputting the second control signal to the host via a second route different from the I2C/I3C communication protocol.

14. An electronic apparatus comprising:
a host configured to communicate in accordance with an I2C/I3C communication protocol;
a controller controlling an imaging unit on a basis of a command and data received from the host in accordance with the I2C/I3C communication protocol; and
a generator
decoding a slave address included in a dummy command received from the host,
generating a control signal indicating whether or not to apply intra-frame dynamic frequency scaling (DFS) or intra-frame dynamic voltage frequency scaling (DVFS) on a basis of the slave address obtained by the decoding, and
outputting the control signal to the host via a route different from the I2C/I3C communication protocol.

* * * * *